UNITED STATES PATENT OFFICE.

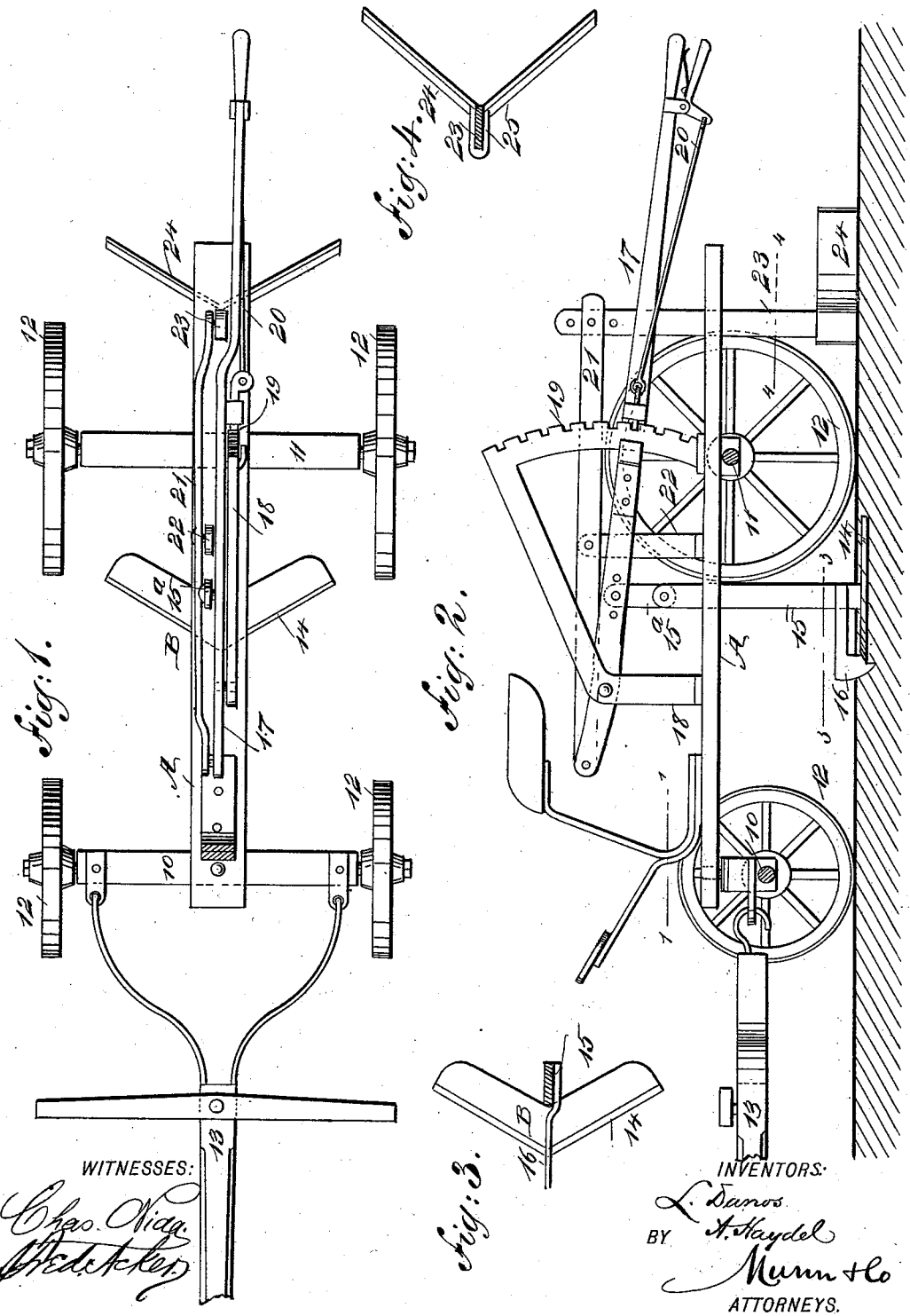

LOUIS DANOS AND ALBERT HAYDEL, OF HOHEN SOLMS, LOUISIANA.

CULTIVATOR.

SPECIFICATION forming part of Letters Patent No. 531,514, dated December 25, 1894.

Application filed May 19, 1894. Serial No. 511,830. (No model.)

*To all whom it may concern:*

Be it known that we, LOUIS DANOS and ALBERT HAYDEL, of Hohen Solms, in the parish of Ascension and State of Louisiana, have invented a new and Improved Cultivator, of which the following is a full, clear, and exact description.

Our invention is an improvement in a class of sugar-cane cultivators having vertically-adjustable scrapers and following plows, or shovels, for forcing laterally the earth loosened by such scrapers.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of the machine, the seat support being in section, the section being taken practically on the line 1—1 of Fig. 2. Fig. 2 is a side elevation of the machine. Fig. 3 is a transverse section through the shank of the scraper, illustrating the latter in plan view, the section being taken on the line 3—3 of Fig. 2; and Fig. 4 is a horizontal section through the shank of the follower or mold board, the said section being taken essentially on the line 4—4 of Fig. 2.

In carrying out the invention a beam or platform A is supported upon the front axle 10 and the rear axle 11, the said axle being provided with ground wheels 12, and the truck thus formed is drawn by a team attached either to a pole 13, or shaft, or by a single horse applied to a shaft if desired.

The scraper B is preferably located beneath the central portion of the platform A, and between the front and rear axle. The scraper is of angular shape, the apex being made to face the front, and the front edge 14 of the scraper is its cutting edge. The scraper is attached at the central portion of its rear edge to a shank or upright 15, the attachment being made in any approved manner; and a knife 16, provided with a convex forward cutting edge is located at the apex of the scraper and extends upwardly therefrom, and a predetermined distance below the scraper at that point, the knife being attached through the medium of a shank or handle to the shank or standard 15 of the scraper, as illustrated in both Figs. 2 and 3 so that it serves to brace the scraper and hold it rigid. The convex edge of the knife, 16, divides the soil so that it is easily parted and thrown laterally by the V-shaped follower or moldboard, 24. It also severs vines, weeds, &c., that may lie in its path, this function being aided by the arrangement of the point of maximum convexity above the plane of the scraper and also above the surface of the ground or soil, as shown, whereby the vines or weeds that come in contact with it are for the most part crowded downward and severed. The standard of the scraper extends upward through an opening in the platform beyond the upper face of the said platform, and is pivoted to a link 15ª, which link is adjustably attached to a hand lever 17, which lever is fulcrumed near its forward end upon a standard 18, located upon the platform, and from this standard a rack 19 is rearwardly projected, the lever having guided movement upon the rack, and it is provided with the usual thumb latch 20, to engage with the rack. A second lever 21, is fulcrumed at or near its center upon a standard 22, projected upward from the bed or platform of the machine. This lever at its forward end is pivotally connected with the forward extremity of the hand lever 17, and the second lever 21 at its rear end is adjustably attached to the upper end of a shank or standard 23, which extends downward through an opening at the rear end of the bed or platform A, and is secured to a follower or mold board 24. This follower or mold board is V-shaped in general contour, and its apex is made to face in the same direction as the apex of the scraper. In fact, the mold board 24, or follower, is adapted to travel over the surface that has been operated upon by the scraper and in the track of the latter. The mold board is preferably provided with an eye 25 at its apex, in which the lower end of its shank or standard 23 is secured.

In the operation of this machine as it is drawn between the rows of cane the lever 17 is pressed downward, carrying with it the scraper 14 and bringing it in operative engagement with the ground, the lever 21 serving at the same time to lower in the same manner the mold board 24. As the machine is drawn forward the knife 16 cuts the ground, severs any weeds that may be within the path of the scraper at the apex of the latter, and divides and loosens the soil. The soil, weeds, and vines thus loosened and severed will pass over the members of the scraper rearwardly to be received by the mold board 24, and directed by it laterally and rearwardly from the center of the track, to the roots of the opposing rows of cane under treatment.

When the machine is to be removed from the field the lever 21 is raised and the mold board and scraper will be elevated likewise.

Having thus described our invention, we claim as new, and desire to secure by Letters Patent—

1. In a cultivator, the combination with a suitable frame and a vertical standard therein, of a horizontal V-shaped scraper fixed on the end of said standard, and a knife fixedly attached to the apex of the scraper, and projecting below it, and having a convex cutting edge, whose point of maximum convexity is above the plane of the scraper, as shown and described.

2. In a cultivator, the combination of a V-shaped moldboard, with the V-shaped scraper arranged in advance, and the knife secured on the scraper and projecting below its point, and means for adjusting the moldboard and scraper vertically, as shown and described, whereby the soil loosened and parted by the scraper is separated and thrown laterally by the moldboard, as specified.

LOUIS DANOS.
ALBERT HAYDEL.

Witnesses:
H. O. MAHER,
J. F. FERNANDEZ.